(12) United States Patent
Hsu et al.

(10) Patent No.: US 10,018,825 B2
(45) Date of Patent: Jul. 10, 2018

(54) MICROSCOPE MONITORING DEVICE AND SYSTEM THEREOF

(71) Applicants: Chung Yuan Christian University, Taoyuan (TW); Vivi3D Technology Inc., Hsinchu County (TW)

(72) Inventors: Yih-Chih Hsu, Taoyuan (TW); Cyun-Fang Hsu, Hsinchu County (TW); Jau-Jiu Ju, Hsinchu County (TW); Chi-Lung Chang, Hsinchu County (TW)

(73) Assignees: CHUNG YUAN CHRISTIAN UNIVERSITY, Taoyuan (TW); VIVI3D TECHNOLOGY INC., Zhudong Township (TW)

( * ) Notice: Subject to any disclaimer, the term of this patent is extended or adjusted under 35 U.S.C. 154(b) by 315 days.

(21) Appl. No.: 14/870,850

(22) Filed: Sep. 30, 2015

(65) Prior Publication Data

US 2017/0068085 A1    Mar. 9, 2017

(30) Foreign Application Priority Data

Sep. 4, 2015  (TW) .............................. 104129440 A

(51) Int. Cl.

| G02B 7/09 | (2006.01) |
| G03B 3/10 | (2006.01) |
| G03B 13/36 | (2006.01) |
| H02K 33/16 | (2006.01) |
| G02B 21/36 | (2006.01) |
| G02B 21/26 | (2006.01) |
| G02B 21/06 | (2006.01) |
| G02B 21/00 | (2006.01) |
| H04N 21/239 | (2011.01) |
| H04N 21/2743 | (2011.01) |
| H04N 21/61 | (2011.01) |

(52) U.S. Cl.
CPC ....... *G02B 21/367* (2013.01); *G02B 21/0088* (2013.01); *G02B 21/06* (2013.01); *G02B 21/26* (2013.01); *G02B 21/362* (2013.01); *H04N 21/2393* (2013.01); *H04N 21/2743* (2013.01); *H04N 21/6125* (2013.01)

(58) Field of Classification Search
CPC .................................. H04N 7/18; G02B 21/36
See application file for complete search history.

(56) References Cited

U.S. PATENT DOCUMENTS

| 2012/0262563 | A1* | 10/2012 | Marcelpoil | G06T 5/006 348/79 |
| 2013/0038727 | A1* | 2/2013 | Clark | C12M 41/14 348/143 |
| 2013/0147916 | A1* | 6/2013 | Bennett | G01B 11/24 348/46 |

* cited by examiner

*Primary Examiner* — Sathyanaraya V Perungavoor
*Assistant Examiner* — Patricia I Young
(74) *Attorney, Agent, or Firm* — Birch, Stewart, Kolasch & Birch, LLP

(57) ABSTRACT

A microscope monitoring device includes a pedestal, a flat light source, a microscope set, an image sensor, a motion stage and a controlling circuit board. The motion stage carries the microscope set and the image sensor and moves them according to a driving signal. Responding to a trigger signal, the image sensor senses the light passing through one or more culture tank on the multiple-well plate and the microscope set so as to generate an image signal. The controlling circuit board outputs the trigger signal and the driving signal to obtain an image of cells in the multiple-well plate. A microscope monitoring system including a server and the aforementioned microscope monitoring device is also provided.

8 Claims, 8 Drawing Sheets

MICROSCOPE MONITORING DEVICE AND SYSTEM THEREOF

CROSS-REFERENCES TO RELATED APPLICATIONS

This non-provisional application claims priority under 35 U.S.C. § 119(a) on Patent Application No. 104129440 filed in Taiwan, R.O.C. on Sep. 4, 2015, the entire contents of which are hereby incorporated by reference.

BACKGROUND

Technical Field

The instant disclosure relates to a microscope, particularly to a microscope monitoring device adapted for an incubator and a system thereof.

Related Art

In the development of bio-technology, it is necessary to have long-term track and follows the growth status of cells. Cell growth often takes several days. During the growth period, the cells may be moved in and out of the incubator for viewing (or observing) the cells. However, the environment change may affect the cell growth.

Consequently, in order to observe the living cells, some companies manufacture the stage top incubator used for the microscope, which installs the control device including the function of air control and the humidity control on the microscope stage. However, it costs high and needs a large space. Furthermore, due to the design limitation of the mechanics, it is not easy to maintain a better temperature and humidity.

SUMMARY

In view of these problems showing above, the first embodiment of the present disclosure provides a microscope monitoring device, which is light and suitable for hand carry with low cost to observe cell(s). More particularly, the microscope monitoring device is adapted for placing in an incubator with suitable environment conditions for the cells.

The microscope monitoring device includes a pedestal, a flat light source, a microscope set, an image sensor, a motion stage and a controlling circuit board. The motion stage carries the microscope set and the image sensor and moves them according to a driving signal. Responding to a trigger signal, the image sensor senses the light passing through at least one culture tank on the multiple-well plate and the microscope set so as to generate an image signal. The controlling circuit board outputs the trigger signal and the driving signal to obtain an image of cells in the multiple-well plate.

The second embodiment of the present disclosure provides a microscope monitoring system including a server and the aforementioned microscope monitoring device is also provided. The microscope monitoring device may send the microscopic image to the server. The server may real-time output the video streaming to an Internet connecting device according to a request.

According to the microscope monitoring device and system of the present disclosure, a microscope monitoring device adapted for an incubator with low cost, small size, replacing high cost device may be obtained. The observer may observe cell(s) image real-time and a time-lapse photography film from cloud computing, which may improve the long-time research experiments.

DETAILED DESCRIPTION

Figure 1:
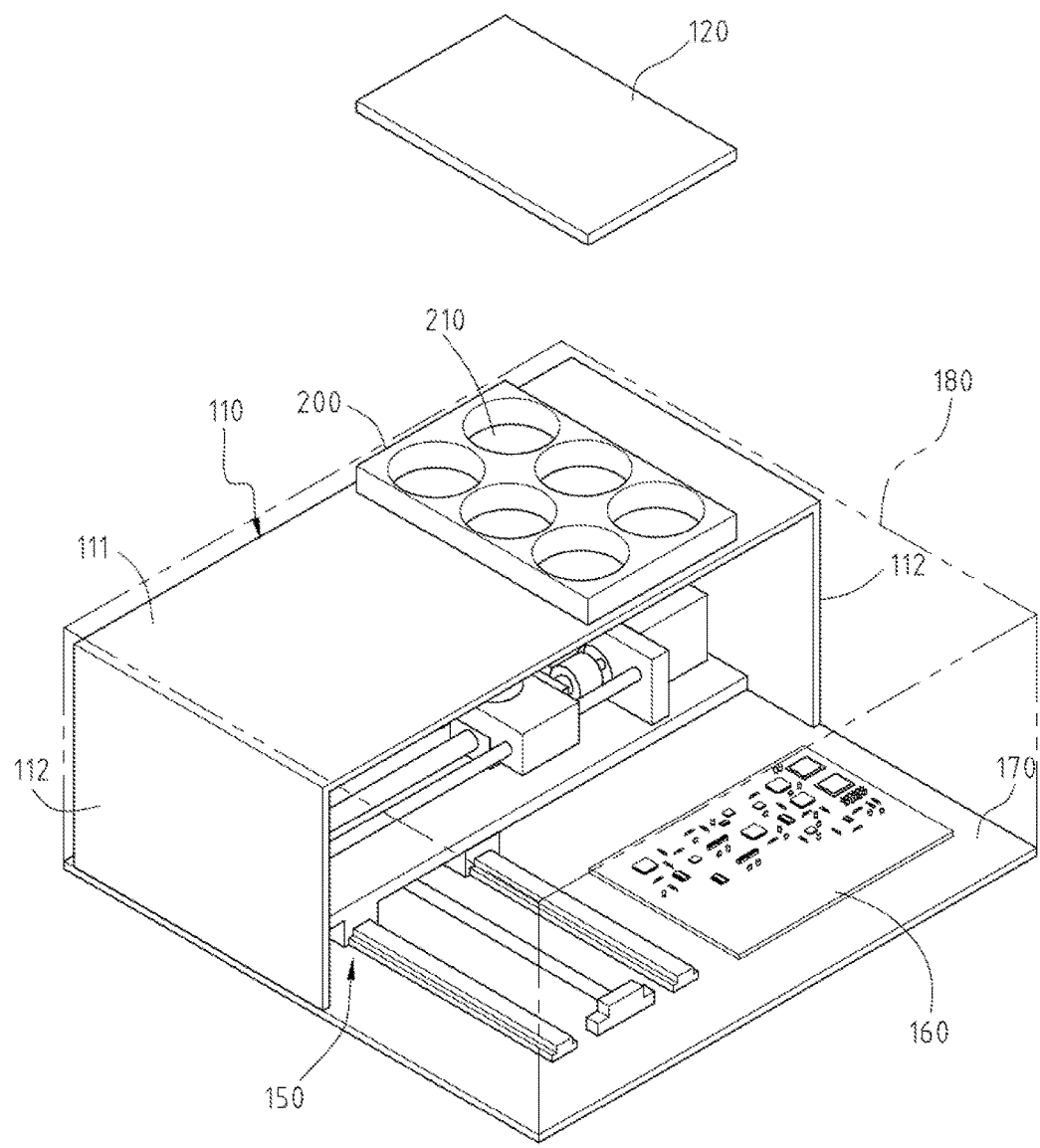
FIG. 1 is a schematic view showing a microscope monitoring device according to the first embodiment of the present invention.
Figure 2:
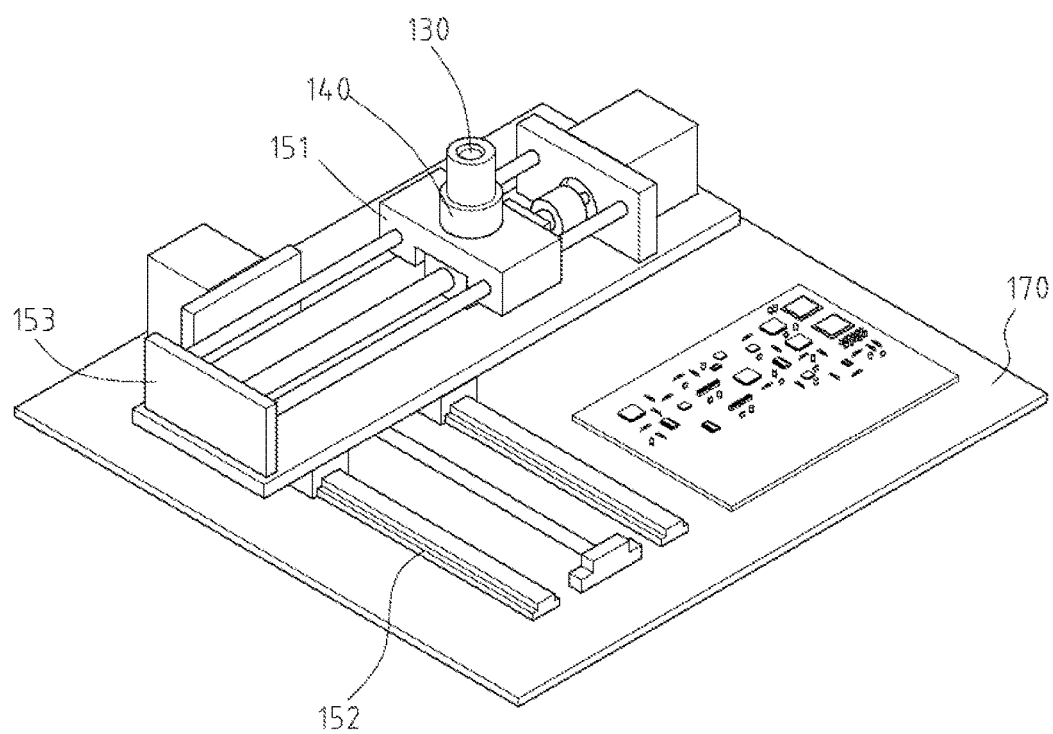
FIG. 2 is a schematic view showing a part of the microscope monitoring device according to the first embodiment of the present invention.
Figure 3:
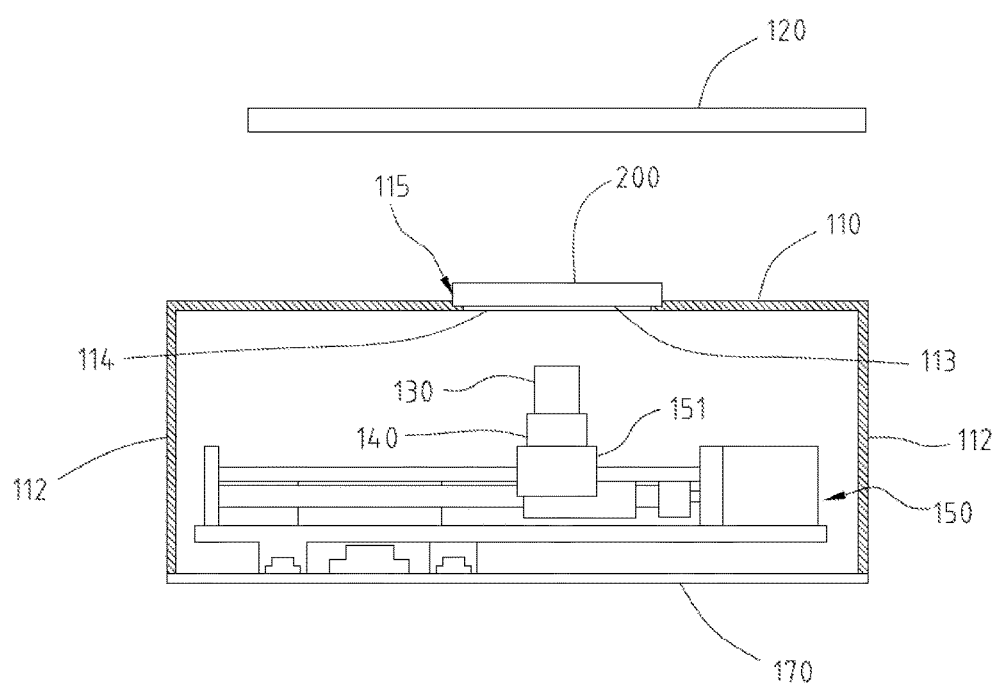
FIG. 3 shows a front view of the microscope monitoring device according to the first embodiment of the present invention.

Please refer to FIG. 1 to FIG. 3. FIG. 1 is a schematic view showing a microscope monitoring device 100 according to the first embodiment of the present invention. FIG. 2 is a schematic view showing a part of the microscope monitoring device 100 according to the first embodiment of the present invention. FIG. 3 shows a front view of the microscope monitoring device 100 according to the first embodiment of the present invention. The microscope monitoring device 100 includes a pedestal 110, a flat light source 120, a set of microscope 130, an image sensor 140, a motion stage 150, and a base board 170. The base board 170 may carry the pedestal 110 and the motion stage 150. The motion stage 150 includes a movable body 151, an X-axis track 152, and a Y-axis track 153. The movable body 151 carries the microscope set 130 and the image sensor 140 and moves on the X-axis track 152 along the X direction and the Y-axis track 153 along the Y direction, so as to control microscope set 130 and the image sensor 140 for the movement. In an embodiment, the motion stage 150 may further include a stepping motor or a servo motor to drive the movable body 151 for movement.

As shown in FIG. 1, the pedestal 110 includes a countertop 111 and a plurality of side wall 112 connecting with the countertop 111. The side walls 112 support the countertop 111 so as to form a receiving space under the countertop 111. In one embodiment, two side walls 112 are disposed in opposition at two edges of the countertop 111 respectively. Referring to FIG. 1 and accompanying with FIG. 3, the countertop 111 includes an observation area 113. A multiple-well plate 200 having a plurality of culture tanks 210 is disposed on the observation area 113. The observation area 113 may include an opening 114 for revealing the culture tanks 210. An accommodation portion 115 is around the opening 114 to allow the multiple-well plate 200 for placing thereon. According to different needs of cell culture and observation, same or different cells may be cultured between very two culture tanks 210 with independent culturing environment. The opening 114 may avoid the microscope set 130 and the image sensor 140 being blocked by the countertop 111, so the image of the cell(s) from the target culture tank 210 may be obtained.

Figure 4:
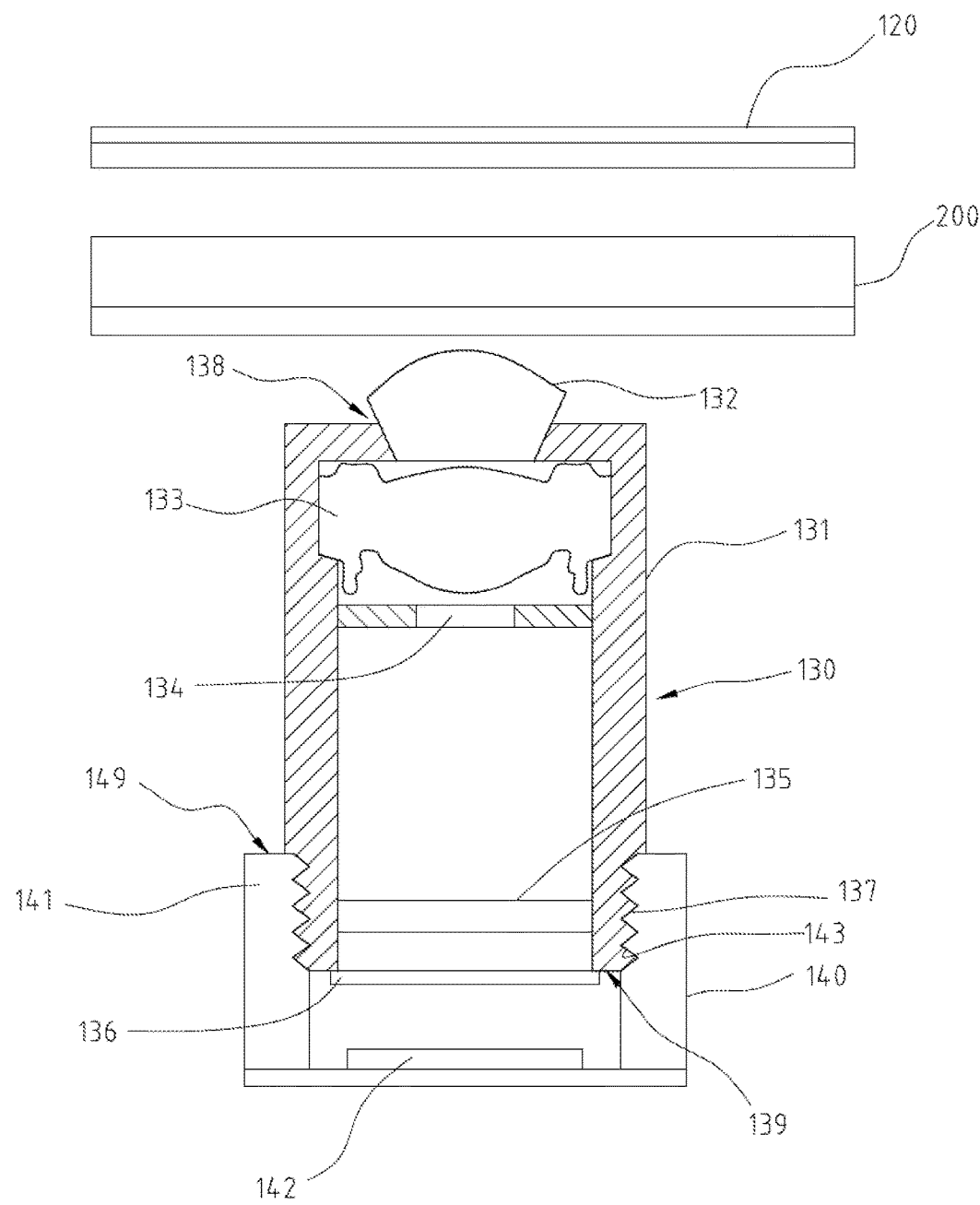
FIG. 4 shows an optical configuration of the microscope monitoring device according to the first embodiment of the present invention.

Please refer to FIG. 1 and FIG. 4 together. FIG. 4 shows an optical configuration of the microscope monitoring device 100 according to the first embodiment of the present invention. The flat light source 120 is disposed above the multiple-well plate 200 and the pedestal 110 and emits light towards to the multiple-well plate 200. The microscope set 130 and the image sensor 140 are connected to each other and disposed under the pedestal 110. In one embodiment, the microscope set 130 includes a lens holder 131, an objective lens 133, an aperture 134, a filter 135, and a cover glass 136. The lens holder 131 includes a first end 138 having a field of view angle area 132 and a second end 139. The objective lens 133, the aperture 134, the filter 135, and the cover glass 136 are disposed orderly within the lens holder 131 from the first end 132 to the second end 139. The image sensor 140 includes a sensor holder 141 and a sensor 142. The sensor 142 is disposed within the sensor holder 141 opposite to a light inlet 149 of the sensor holder 141. The sensor 142 may be a CCD (Charge Coupled Device) or a CMOS (Complementary Metal-Oxide Semiconductor). In one embodiment, an outer surface of the second end 139 of the lens holder 131 includes outer threads 137, and an inner surface of the light inlet 149 of the sensor holder 141 includes inner threads 143 corresponding to the outer threads 137. Accordingly, the microscope set 130 and the image sensor 140 may be fixed by screwing the inner threads 143 with the outer threads 137. However, the present invention is not limited to using the screwing method for fixing; alternatively, the wedging or interlinking method may be used for the fixing. Though FIG. 4 shows with only one objective lens 133, which is not used to limit the present invention, additional lens may be added to the objective lens 133 depending on the need of magnification. The microscope monitoring device 100 further include a transparent protective cover 180 disposed on the base board 170 for covering the pedestal 110, the microscope set 130, and the image sensor 140. The transparent protective cover 180 includes a through hole corresponding to the observation area 113, so the multiple-well plate 200 may be exposed from the transparent protective cover 180.

In one embodiment, the microscope set 130 may omit the filter 135; alternatively, another filter having different bandwidth may be used depending on the need of the optical band. In the other embodiment, the cover glass 136 may be omitted.

In one embodiment, the microscope set 130 may be autofocus, which may obtain clear image by adjusting the focus according to the distance of an object.

Figure 5:
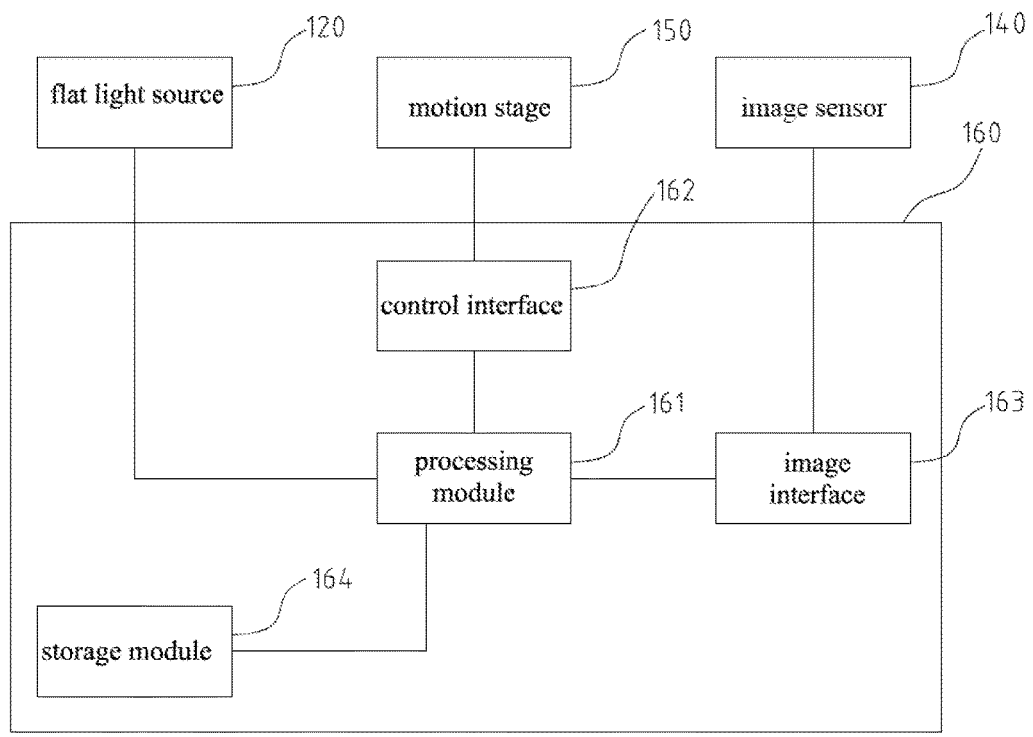
FIG. 5 shows a circuit block diagram of the microscope monitoring device according to the first embodiment of the present invention.

Please refer to FIG. 1 and FIG. 5 together. FIG. 5 shows a circuit block diagram of the microscope monitoring device 100 according to the first embodiment of the present invention. The microscope monitoring device 100 further includes a controlling circuit board 160, which may be an embedded system main board (such as Raspberry Pi®). The controlling circuit board 160 may be disposed on the base board 170 or the receiving space between the pedestal 110 and the base board 170. Furthermore, the controlling circuit board 160 may be separated with the pedestal 110 and the base board 170. According to the present invention, the disposition of the controlling circuit board 160 is not limited. The controlling circuit board 160 includes a processing module 161, a control interface 162, and an image interface 163. The control interface 162 and the image interface 163 are electronically connected to the processing module 161. The control interface 162 is electronically connected to the motion stage 150, so as to allow the processing module 161 outputting a control signal to the motion stage 150 through the control interface 162. Accordingly, the movable body 151 of the motion stage 150 may be controlled to move parallel to the multiple-well plate 200. The processing module 161 may substantially be a microprocessor, an SOC (System on Chip), or other chip capable of computing. The control interface 162 and/or the image interface 163 may be a GPIO (General Purpose I/O) interface, a serial transmission interface (such as I2C, RS232, or USB) or a parallel transmission interface. The image interface 163 is electronically connected to the image sensor 140, and the processing module 161 outputs a trigger signal (including a shooting command) to the image sensor 140, so the image sensor 140 may capture image(s). The image interface 163 may allow the processing module 161 receiving image signal sent from the image sensor 140. The image sensor 140 senses the light passing through at least one culture tank 210 on the multiple-well plate 200 and the microscope set 130 (as shown in FIG. 4) and generates the image signal. The processing module 161 may transfer the file format from the image signal to a microscopic image. According to a target culture tank 210 (to be observed), the controlling circuit board 160 may control the microscope set 130 and the image sensor 140 to move by the driving signal and control the image sensor 140 to capture image(s) by the trigger signal, so the image of the cell(s) from the target culture tank 210 may be obtained. The motion stage 150 may move the microscope set 130 and the image sensor 140 sequentially to and under every culture tank 210, and the image sensor 140 may obtain the image signal of every culture tank 210, sequentially. Consequently, when the microscope monitoring device 100 is disposed within an incubator, the cells' image may be obtained without manual operation. Also, the cell(s) in the culture tank 210 of the multiple-well plate 200 located within the incubator may maintain a specific condition for temperature, humidity, and carbon dioxide concentration without affect from outer environment.

In some embodiments, the trigger signal may be sent to the image sensor 140 without the image interface 163, and the processing module 161 may transmit the trigger signal to the image sensor 140 by other transmission interface(s), such as GPIO (General Purpose I/O) interface, a serial transmission interface (such as I2C, RS232, or USB) or a parallel transmission interface.

In some embodiments, the control interface 162 or the image interface 163 may be a wireless interface, such as Wi-Fi, Bluetooth, infrared, etc. Consequently, the processing module 161 may send the control signal and the trigger signal to the motion stage 150. Alternatively, the trigger signal may be sent to the image sensor 140 wirelessly, and the processing module 161 may receive the image signal sent from the image sensor 140 wirelessly.

In this embodiment, the controlling circuit board 160 further includes a storage module 164. The storage module 164 is electronically connected to the processing module 161 for storing the microscopic image. The storage module 164 may be a memory card (such as a SD card), non-volatile memory (such as flash memory), etc.

The storage module 164 may further store a monitoring preference including an assigned culture tank parameter, a monitoring frequency parameter, and a monitoring time parameter. According to the monitoring preference, the processing module 161 may output the trigger signal and the driving signal. An assigned culture parameter may be used to assign one or more culture tanks 210 to be monitored (or observed); for example, the culture tank 210 on which column and which row, or the culture tank 210 with which number is/are to be monitored. The storage module 164 may store coordinate positions corresponding to culture tanks 210, respectively. And the processing module 161 may output the driving signal based on the coordinate position(s) of the assigned culture tank(s) 210. The monitoring frequency parameter may refer to a monitoring frequency (such as every ten minutes, every three hours, every day, etc.) of each assigned culture tank 210. The monitoring frequency for each assigned culture tank 210 may be same, or different with suitable frequency. The monitoring time parameter may refer to the time of the year, the month, the date, the hour, the minute, and the second for the assigned culture tank(s) 210 to be monitored. The above parameter(s) are provided for example, and the monitoring preference may further include other parameter, depending on the monitoring need.

Figure 6:
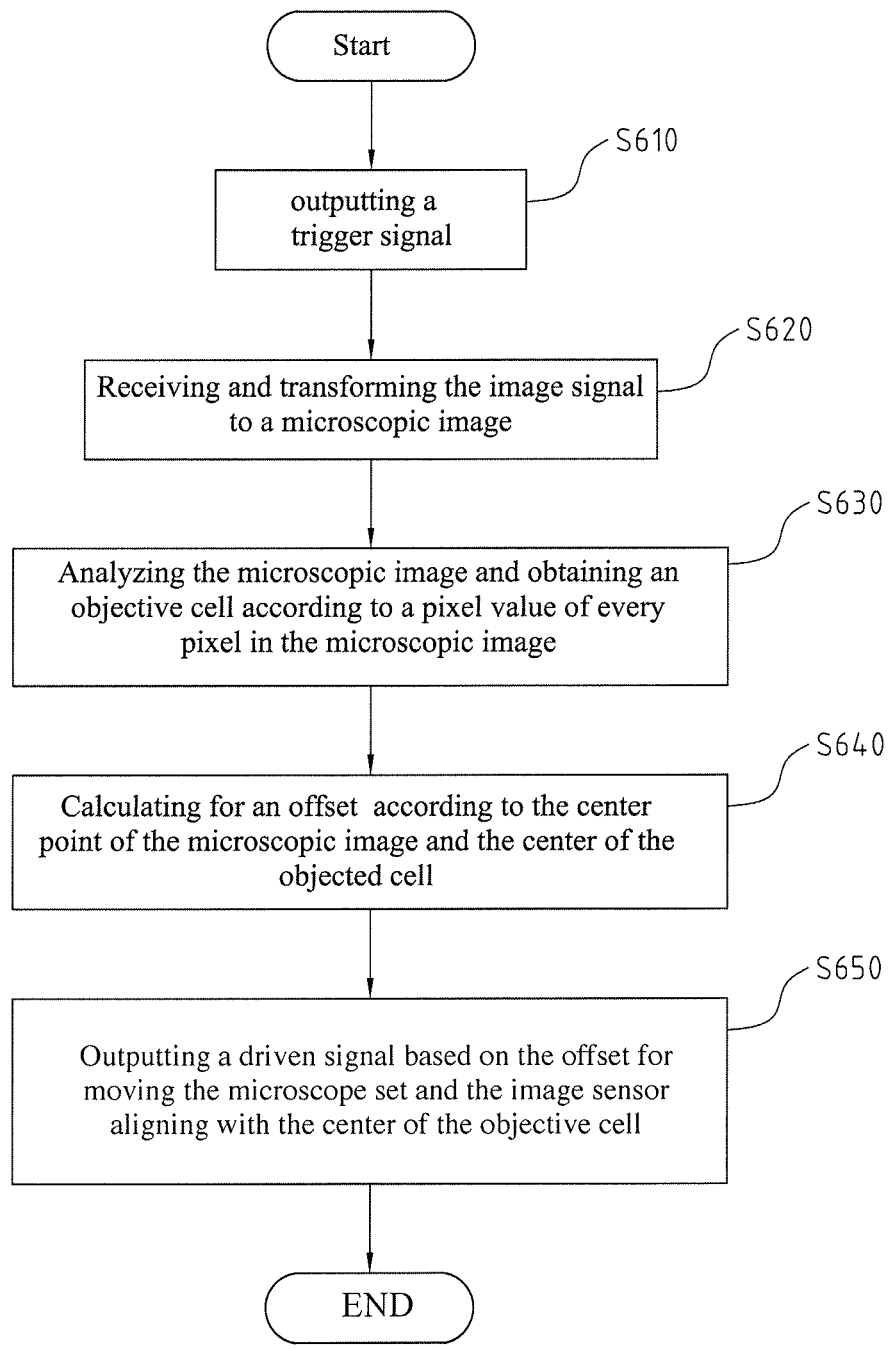
FIG. 6 is a flow chart showing a locating method for cells according to the first embodiment of the present invention.
Figure 7:
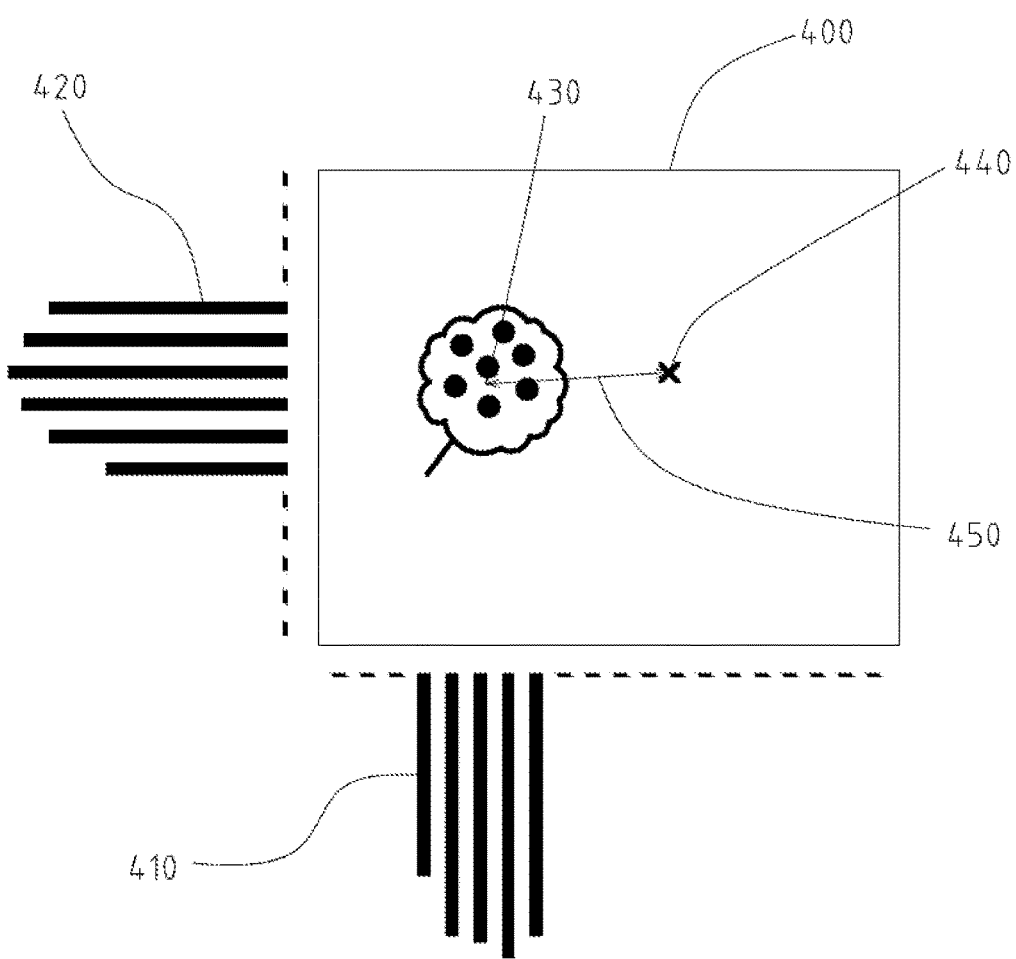
FIG. 7 is an image analysis example according to the first embodiment of the present invention.

Referring to FIG. 6, which shows a flow chart showing a locating method for cells according to the first embodiment of the present invention. The storage module 164 may store a locating and tracking program for the processing module 161 to execute the program to perform (repeatedly) the locating method for cells for the assigned culture tank(s) 210. After the microscope set 130 and the image sensor 140 are moved to and under the assigned culture tank 210, then perform Step S610 of outputting the trigger signal so as to drive the image sensor 140 capturing image(s). Next, in Step 620, the image signal is received and transformed to a microscopic image. After the microscopic image is obtained, the microscopic image may be analyzed by an image analyzing method. According to a pixel value of every pixel in the microscopic image, an objective cell in the microscopic image may be found (Step S630). Referring to FIG. 7, which shows an image analysis example according to the first embodiment of the present invention. Accompanying with FIG. 6 and FIG. 7, the pixel value may be a gray level value or a luminance value, etc. The pixel value of cell (s) is higher than other object, so the position 430 of the objective cell may be found by histograms with calculating the pixel value(s) of each column and each row. The horizontal histogram 410 shows the sum of the pixel value of every vertical axis, and the vertical histogram 420 shows the sum of the pixel value of every horizontal axis. In this embodiment, the position of the cell(s) is/are found by higher pixel value(s); however, in some embodiments, the lower pixel value(s) may be used to found cell(s), which may be depending on the condition of the light intensity or cell staining.

Next, in Step S640, an offset 450 is calculated according to the center point 440 of the microscopic image 400 and the center of the objected cell (i.e., the distance therebetween). In Step S650, the driving signal is output according to the offset 450, so as to move the microscope set 130 and the image sensor 140 aligning with the center 430 of the objective cell for next capturing image to obtain a center image for the objective cell when displaying. The present method may be used for observing live cell(s) and continuously tracking cell(s), and the cell image may be avoided to be out of field of microscope view.

In this embodiment, the flat light source 120 is electronically connected to the processing module 161 of the controlling circuit board 160. The processing module 161 may output a control signal for controlling the flat light source 120 on or off. In addition, the flat light source 120 may be RGB LEDs with array arrangement, and the flat light source 120 may be controlled, based on the control signal, to emit with white light or photo-luminescence (i.e., Purplish blue color).

In some embodiments, the flat light source 120 may have an independent control device and is disconnected to the controlling circuit board 160. A user may manually operate the control device for turning on or off the flat light source 120, and/or assigning a specific color emitted by the flat light source 120.

In this embodiment, the microscope monitoring device 100 further includes a power supply (such as battery) to provide operation power for the microscope monitoring device 100.

Figure 8:
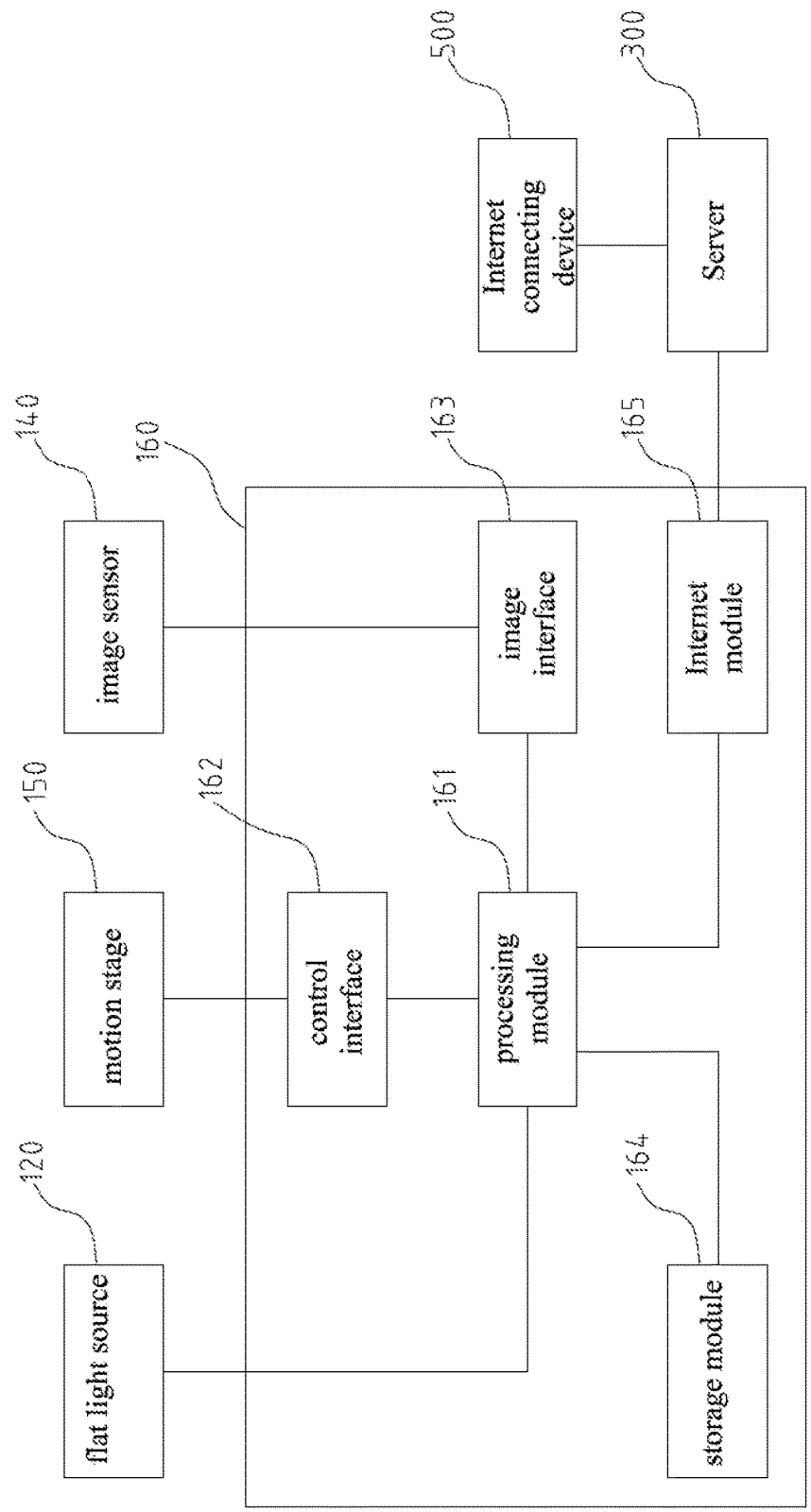
FIG. 8 shows a block diagram of the microscope monitoring device according to the second embodiment of the present invention.

Referring to FIG. 8, which shows a block diagram of the microscope monitoring device according to the second embodiment of the present invention. The present embodiment provides a microscope monitoring system, which include the first embodiment of the microscope monitoring device 100 as described above and a server 300. Comparing with the first embodiment, in this embodiment, the controlling circuit board 160 may further include an Internet module 165 electronically connecting to the processing module 161. The processing module 161 may be connected with the server 300 through the Internet module 165, and the microscopic image may be sent to the server for storing. The object of the remote backup may be achieved. In this embodiment, the Internet module 165 may be wired Internet module, such as Ethernet module or other wired Internet transmission module. Alternatively, the Internet module 165 may be wireless Internet module, such as the wireless Internet module satisfied with the spec of IEEE 802.11 (e.g., 802.11a/b/g/n), or other wireless Internet transmission module.

In some embodiments, the server 300 may provide an animation according to the received microscopic images in series captured from the same culture tank 210. Consequently, a time-lapse photography film of the objective cell(s) may be obtained.

In some embodiments, the server 300 may receive a request from an Internet connecting device 500 (such as a mobile phone, a PAD computer, a notebook computer, and an electronic device connectable to the Internet) and respond to the request by outputting the real-time video streaming of the microscopic image to the Internet connecting device 500. In other words, the observer may use his/her Internet connecting device 500 to connect to the server 300, and the server 300 may request the microscope monitoring device 100 to send the captured microscopic image(s) to the Internet connecting device 500 by technique of real-time video streaming Consequently, the observer may real-time see the microscopic image(s).

According to the microscope monitoring device and system of the present disclosure, a microscope monitoring device adapted for an incubator with low cost, small size, replacing high cost device may be obtained. The observer may observe cell(s) image real-time and a time-lapse photography film from cloud computing, which may improve the long-time research experiments.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:
1. A microscope monitoring device comprising:
a pedestal including an observation area for placing a multiple-well plate having a plurality of culture tank thereon;
a flat light source disposed above the pedestal and emitting light towards to the multiple-well plate;
a microscope set disposed under the pedestal;
an image sensor connecting to the microscope set and used for sensing the light passing through at least one culture tank on the multiple-well plate and the microscope set so as to generate an image signal according to a trigger signal;
a motion stage carrying the microscope set and the image sensor and moving the microscope set and the image sensor according to a driving signal; and
a controlling circuit board electronically connecting to the image sensor and the motion stage, wherein the controlling circuit board generates the trigger signal and the driving signal to obtain the image signal of the least one culture tank, the controlling circuit board comprises:
a control interface electronically connected to the motion stage for outputting the driving signal to the motion stage;
an image interface electronically connected to the image sensor for receiving the image signal;
a processing module electronically connected to the control interface and the image interface for transforming the image signal to a microscopic image; and
a storage module electronically connected to the processing module for storing the microscopic image and a locating and tracking program,
wherein the processing module is configured to execute the locating and tracking program repeatedly to
output the trigger signal;
receive and transform the image signal to the microscopic image;
analyze the microscopic image to obtain an objective cell according to a horizontal histogram and a vertical histogram of the microscopic image;
calculate an offset according to a center point of the microscopic image and a center of the objective cell; and
drive the microscope set and the image sensor using the offset to align with the center of the objective cell.

2. The microscope monitoring device according to claim 1, wherein the controlling circuit board further comprises:
an Internet module electronically connecting to the processing module for transmitting the microscopic image to a server for storing.

3. The microscope monitoring device according to claim 1, wherein the storage module stores a monitoring preference comprising an assigned culture tank parameter, a monitoring frequency parameter, and a monitoring time parameter, and the processing module outputs the trigger signal and the driving signal according to the monitoring preference.

4. The microscope monitoring device according to claim 1, wherein the motion stage moves the microscope set and the image sensor sequentially to and under every culture tank, and the image sensor obtains the image signal of every culture tank, sequentially.

5. The microscope monitoring device according to claim 1, wherein the controlling circuit board electronically connected to the flat light source for outputting a control signal that controls the flat light source emit with white light or photo-luminescence.

6. A microscope monitoring system, comprising:
a server; and
a microscope monitoring device comprising:
a pedestal including an observation area for placing a multiple-well plate having a plurality of culture tank thereon;
a flat light source disposed above the pedestal and emitting light towards to the multiple-well plate;
a microscope set disposed under the pedestal;
an image sensor connecting to the microscope set and used for sensing the light passing through at least one culture tank on the multiple-well plate and the microscope set so as to generate an image signal according to a trigger signal;
a motion stage carrying the microscope set and the image sensor and moving the microscope set and the image sensor according to a driving signal; and
a controlling circuit board electronically connecting to the image sensor and the motion stage, wherein the controlling circuit board generates the trigger signal and the driving signal to obtain the image signal of the least one culture tank, transform the image signal to a microscopic image, and send the microscopic image to the server for storing, the controlling circuit board comprises:
a control interface electronically connected to the motion stage for outputting the driving signal to the motion stage;
an image interface electronically connected to the image sensor for receiving the image signal;
a processing module electronically connected to the control interface and the image interface for transforming the image signal to a microscopic image; and
a storage module electronically connected to the processing module for storing the microscopic image and a locating and tracking program,
wherein the processing module is configured to execute the locating and tracking program repeatedly to
output the trigger signal;
receive and transform the image signal to the microscopic image;
analyze the microscopic image to obtain an objective cell according to a horizontal histogram and a vertical histogram of the microscopic image;
calculate an offset according to a center point of the microscopic image and a center of the objective cell; and
drive the microscope set and the image sensor using the offset to align with the center of the objective cell.

7. The microscope monitoring system according to claim 6, wherein the server provides an animation according to the microscopic images in series captured from the same one of the at least one culture tank.

8. The microscope monitoring system according to claim 6, wherein the microscopic image is a video streaming, and wherein the server real-time outputs the video streaming to an Internet connecting device according to a request.

* * * * *